US012755202B2

(12) United States Patent
Huynh et al.

(10) Patent No.: US 12,755,202 B2
(45) Date of Patent: Oct. 6, 2026

(54) METHOD AND SYSTEM FOR LEARNABLE AUGMENTATION FOR TIME SERIES PREDICTION UNDER DISTRIBUTION SHIFTS

(71) Applicant: JPMorgan Chase Bank, N.A., New York, NY (US)

(72) Inventors: Dat Huynh, Boston, MA (US); Elizabeth Fons, London (GB); Svitlana Vyetrenko, Berkeley, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 595 days.

(21) Appl. No.: 18/227,060

(22) Filed: Jul. 27, 2023

(65) Prior Publication Data

US 2024/0127113 A1 Apr. 18, 2024

Related U.S. Application Data

(60) Provisional application No. 63/411,701, filed on Sep. 30, 2022.

(51) Int. Cl.
*G06N 20/00* (2019.01)

(52) U.S. Cl.
CPC .................................... *G06N 20/00* (2019.01)

(58) Field of Classification Search
CPC ....... G06N 20/00; G06N 3/096; G06N 3/0455
See application file for complete search history.

(56) References Cited

U.S. PATENT DOCUMENTS

| | | | | |
|---|---|---|---|---|
| 11,568,208 | B2 * | 1/2023 | Valpola .................... | G06N 3/08 |
| 2019/0236447 | A1 * | 8/2019 | Cohen ...................... | G06N 3/08 |
| 2021/0117774 | A1 * | 4/2021 | Choi ...................... | G06N 3/088 |

(Continued)

OTHER PUBLICATIONS

Flores, A., Tito-Chura, H., Apaza-Alanoca, H. (2021). Data Augmentation for Short-Term Time Series Prediction with Deep Learning. In: Arai, K. (eds) Intelligent Computing. Lecture Notes in Networks and Systems, vol. 284. Springer, Cham. (Year: 2021).*

(Continued)

*Primary Examiner* — Kris E Mackes

(74) *Attorney, Agent, or Firm* — Greenblum & Bernstein, P.L.C.

(57) ABSTRACT

A method and a system for using a learnable augmentation technique to perform few-shot calibration of a model that is designed to generate time series predictions under distribution shifts with improved accuracy are provided. The method includes: receiving first information that relates to a source distribution of a time series and second information that relates to a target distribution of the time series; extracting a latent code from samples of the target distribution; perturbing the latent code by adding random noise in order to generate augmented samples of the target distribution; training a classifier based on samples of the source distribution; adjusting the classifier based on a combination of the samples of the source distribution and the augmented samples of the target distribution; and using the adjusted classifier to train a machine learning model that is usable for making future predictions that relate to the time series.

12 Claims, 5 Drawing Sheets

(56) References Cited

U.S. PATENT DOCUMENTS

2022/0383109 A1 * 12/2022 Deng ........................ G06N 3/08

OTHER PUBLICATIONS

Wen, Qingsong, et al. "Time Series Data Augmentation for Deep Learning: A Survey" Proceedings of the Thirtieth International Joint Conference on Artificial Intelligence, International Joint Conferences on Artificial Intelligence Organization, 2021, pp. 4653-4660. (Year: 2021).*

* cited by examiner

500

METHOD AND SYSTEM FOR LEARNABLE AUGMENTATION FOR TIME SERIES PREDICTION UNDER DISTRIBUTION SHIFTS

CROSS-REFERENCE TO RELATED APPLICATIONS

This application claims priority benefit from U.S. Provisional Application No. 63/411,701, filed Sep. 30, 2022, which is hereby incorporated by reference in its entirety.

BACKGROUND

1. Field of the Disclosure

This technology generally relates to methods and systems for performing time series prediction, and more particularly to methods and systems for using a learnable augmentation technique to perform few-shot calibration of a model that is designed to generate time series predictions under distribution shifts with improved accuracy.

2. Background Information

Time series prediction is the task of classifying or categorizing sequential inputs to gain further insight into their behavior, with important applications in multiple domains such as weather forecasting, medical diagnoses, and financial prediction. In particular, financial data reflects the different aspects of the economy.

As society evolves continuously, financial data is prone to distribution shifts over time, where the time series dynamics deviate from previous patterns. Thus, time series models pretrained from past data are no longer effective on current data. Similarly, it is common in practice to have wider access to the time series data for higher liquidity assets, and it is sometimes necessary to adapt models trained for high liquidity assets to low liquid assets with a relatively small number of data samples.

Accordingly, there is a need for a mechanism for using a learnable augmentation technique to perform few-shot calibration of a model that is designed to generate time series predictions under distribution shifts with improved accuracy.

SUMMARY

The present disclosure, through one or more of its various aspects, embodiments, and/or specific features or sub-components, provides, inter alia, various systems, servers, devices, methods, media, programs, and platforms for methods and systems for using a learnable augmentation technique to perform few-shot calibration of a model that is designed to generate time series predictions under distribution shifts with improved accuracy.

According to an aspect of the present disclosure, a method for performing time series prediction is provided. The method is implemented by at least one processor. The method includes: receiving, by the at least one processor, first information that relates to a source distribution of a time series; receiving, by the at least one processor, second information that relates to a target distribution of the time series; extracting, by the at least one processor, at least one latent code from a plurality of samples of the target distribution; perturbing, by the at least one processor, the extracted at least one latent code by adding a predetermined amount of random noise in order to generate at least one augmented sample of the target distribution; training, by the at least one processor, a classifier based on a plurality of samples of the source distribution; adjusting, by the at least one processor, the classifier based on a combination of the plurality of samples of the source distribution and a predetermined number of the at least one augmented sample of the target distribution; and training, by the at least one processor by using the adjusted classifier, a predetermined machine learning model that is usable for making future predictions that relate to the time series.

The extracting of the at least one latent code may include using an encoder to capture a transformation from a first sample of the target distribution to a second sample of the target distribution.

The adjusting may include selecting a mixture coefficient value that relates to the predetermined number of the at least one augmented sample used for forming the combination.

The source distribution may include time series data that relates to a first predetermined historical time interval. The target distribution may include time series data that relates to a second predetermined historical time interval that is different from, shorter than, and more recent than the first predetermined historical time interval.

The time series may include a univariate time series.

The univariate time series may include a first time series that relates to stock market data.

Alternatively, the time series may include a multivariate time series.

The multivariate time series may include one from among a second time series that relates to yield rate curve data, a third time series that relates to weather forecasting data, and a fourth time series that relates to medical diagnosis data.

The predetermined machine learning model may include at least one from among a tree-based model, a neural network model, and a linear model.

According to another exemplary embodiment, a computing apparatus for performing time series prediction is provided. The computing apparatus includes a processor; a memory; and a communication interface coupled to each of the processor and the memory. The processor is configured to: receive, via the communication interface, first information that relates to a source distribution of a time series; receive, via the communication interface, second information that relates to a target distribution of the time series; extract at least one latent code from a plurality of samples of the target distribution; perturb the extracted at least one latent code by adding a predetermined amount of random noise in order to generate at least one augmented sample of the target distribution; train a classifier based on a plurality of samples of the source distribution; adjust the classifier based on a combination of the plurality of samples of the source distribution and a predetermined number of the at least one augmented sample of the target distribution; and train, by using the adjusted classifier, a predetermined machine learning model that is usable for making future predictions that relate to the time series.

The processor may be further configured to extract the at least one latent code by using an encoder to capture a transformation from a first sample of the target distribution to a second sample of the target distribution.

The processor may be further configured to perform the adjustment of the classifier by selecting a mixture coefficient value that relates to the predetermined number of the at least one augmented sample used for forming the combination.

The source distribution may include time series data that relates to a first predetermined historical time interval. The target distribution may include time series data that relates to a second predetermined historical time interval that is different from, shorter than, and more recent than the first predetermined historical time interval.

The time series may include a univariate time series.

The univariate time series may include a first time series that relates to stock market data.

Alternatively, the time series may include a multivariate time series.

The multivariate time series may include one from among a second time series that relates to yield rate curve data, a third time series that relates to weather forecasting data, and a fourth time series that relates to medical diagnosis data.

The predetermined machine learning model may include at least one from among a tree-based model, a neural network model, and a linear model.

According to yet another exemplary embodiment, a non-transitory computer readable storage medium storing instructions for performing time series prediction is provided. The storage medium includes executable code which, when executed by a processor, causes the processor to: receive first information that relates to a source distribution of a time series; receive second information that relates to a target distribution of the time series; extract at least one latent code from a plurality of samples of the target distribution; perturb the extracted at least one latent code by adding a predetermined amount of random noise in order to generate at least one augmented sample of the target distribution; train a classifier based on a plurality of samples of the source distribution; adjust the classifier based on a combination of the plurality of samples of the source distribution and a predetermined number of the at least one augmented sample of the target distribution; and train, by using the adjusted classifier, a predetermined machine learning model that is usable for making future predictions that relate to the time series.

When executed, the executable code may further cause the processor to extract the at least one latent code by using an encoder to capture a transformation from a first sample of the target distribution to a second sample of the target distribution.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
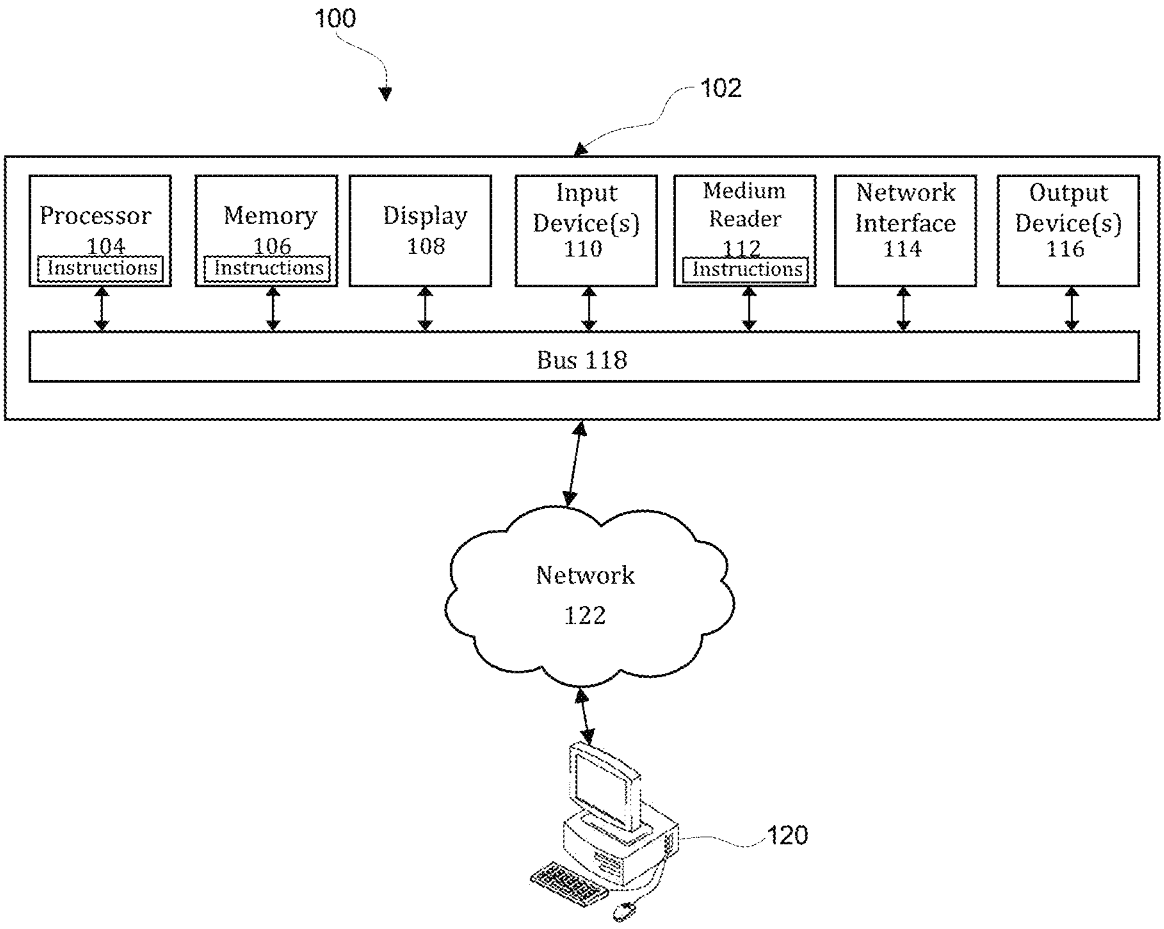
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using a learnable augmentation technique to perform few-shot calibration of a model that is designed to generate time series predictions under distribution shifts with improved accuracy.

Figure 2:
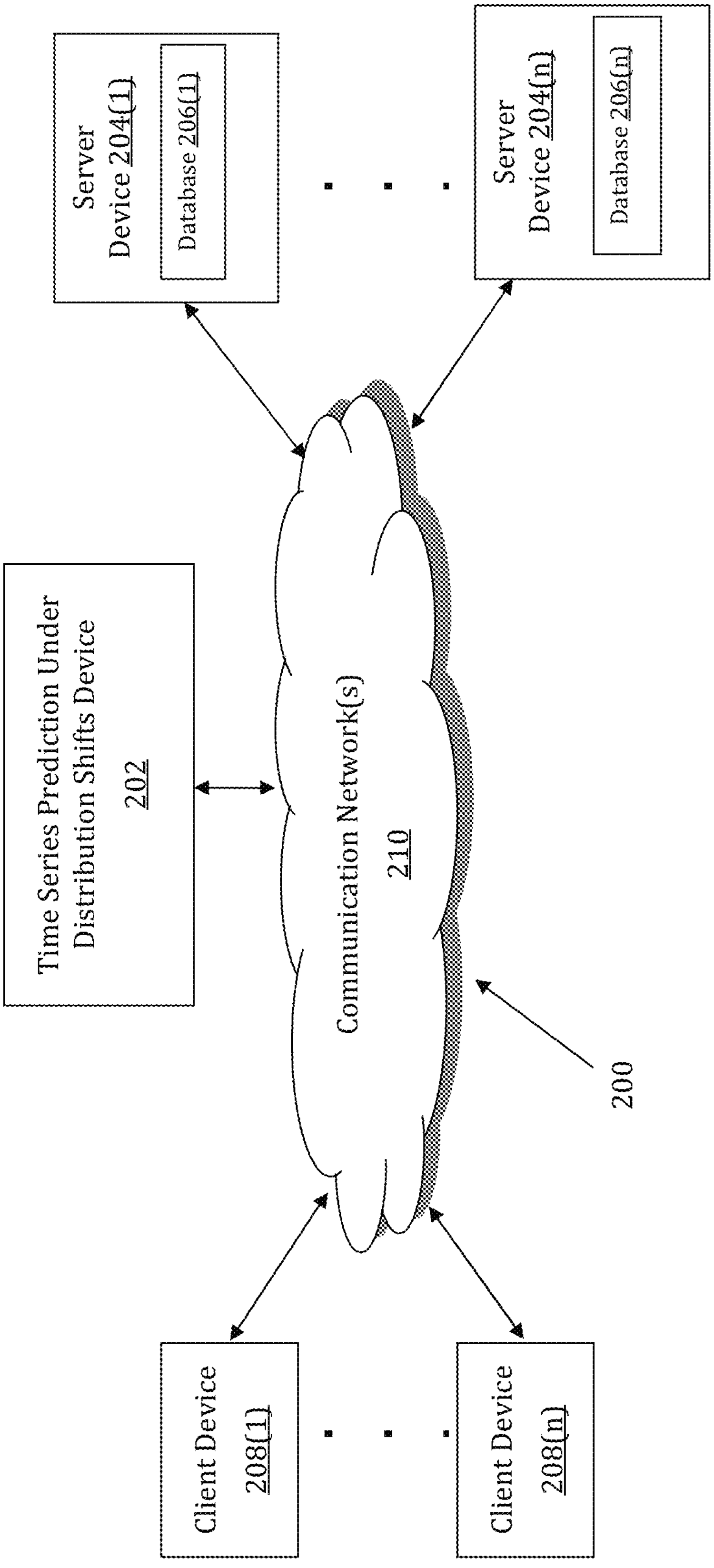
FIG. 2 illustrates an exemplary diagram of a network environment.

Referring to FIG. 2, a schematic of an exemplary network environment 200 for implementing a method for using a learnable augmentation technique to perform few-shot calibration of a model that is designed to generate time series predictions under distribution shifts with improved accuracy is illustrated. In an exemplary embodiment, the method is executable on any networked computer platform, such as, for example, a personal computer (PC).

The method for using a learnable augmentation technique to perform few-shot calibration of a model that is designed to generate time series predictions under distribution shifts with improved accuracy may be implemented by a Time Series Prediction Under Distribution Shifts (TSPUDS) device 202. The TSPUDS device 202 may be the same or similar to the computer system 102 as described with respect to FIG. 1. The TSPUPDS device 202 may store one or more applications that can include executable instructions that, when executed by the TSPUDS device 202, cause the TSPUDS device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the TSPUDS device 202 itself, may be located in virtual server(s) running in a cloud-based computing environment rather than being tied to one or more specific physical network computing devices. Also, the application(s) may be running in one or more virtual machines (VMs) executing on the TSPUDS device 202. Additionally, in one or more embodiments of this technology, virtual machine(s) running on the TSPUDS device 202 may be managed or supervised by a hypervisor.

In the network environment 200 of FIG. 2, the TSPUDS device 202 is coupled to a plurality of server devices 204(1)-204(*n*) that hosts a plurality of databases 206(1)-206(*n*), and also to a plurality of client devices 208(1)-208(*n*) via communication network(s) 210. A communication interface of the TSPUDS device 202, such as the network interface 114 of the computer system 102 of FIG. 1, operatively couples and communicates between the TSPUDS device 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TSPUDS device 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and TSPUDS devices that efficiently implement a method for using a learnable augmentation technique to perform few-shot calibration of a model that is designed to generate time series predictions under distribution shifts with improved accuracy.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TSPUDS device 202 may be a standalone device or integrated with one or more other devices or apparatuses, such as one or more of the server devices 204(1)-204(*n*), for example. In one particular example, the TSPUDS device 202 may include or be hosted by one of the server devices 204(1)-204(*n*), and other arrangements are also possible. Moreover, one or more of the devices of the TSPUDS device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the TSPUDS device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store time series data and data that relates to accuracy metrics for time series predictions.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208 (1)-208(*n*) in this example may include any type of computing device that can interact with the TSPUDS device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the TSPUDS device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the TSPUDS device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TSPUDS device 202, the server devices 204(1)-204(*n*), or the client devices 208(1)-208(*n*), for example, may be configured to operate as virtual instances on the same physical machine. In other words, one or more of the TSPUDS device 202, the server devices 204(1)-204(*n*), or the client devices 208(1)-208(*n*) may operate on the same physical device rather than as separate devices communicating through communication network(s) 210. Additionally, there may be more or fewer TSPUDS devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the internet, intranets, and combinations thereof.

Figure 3:
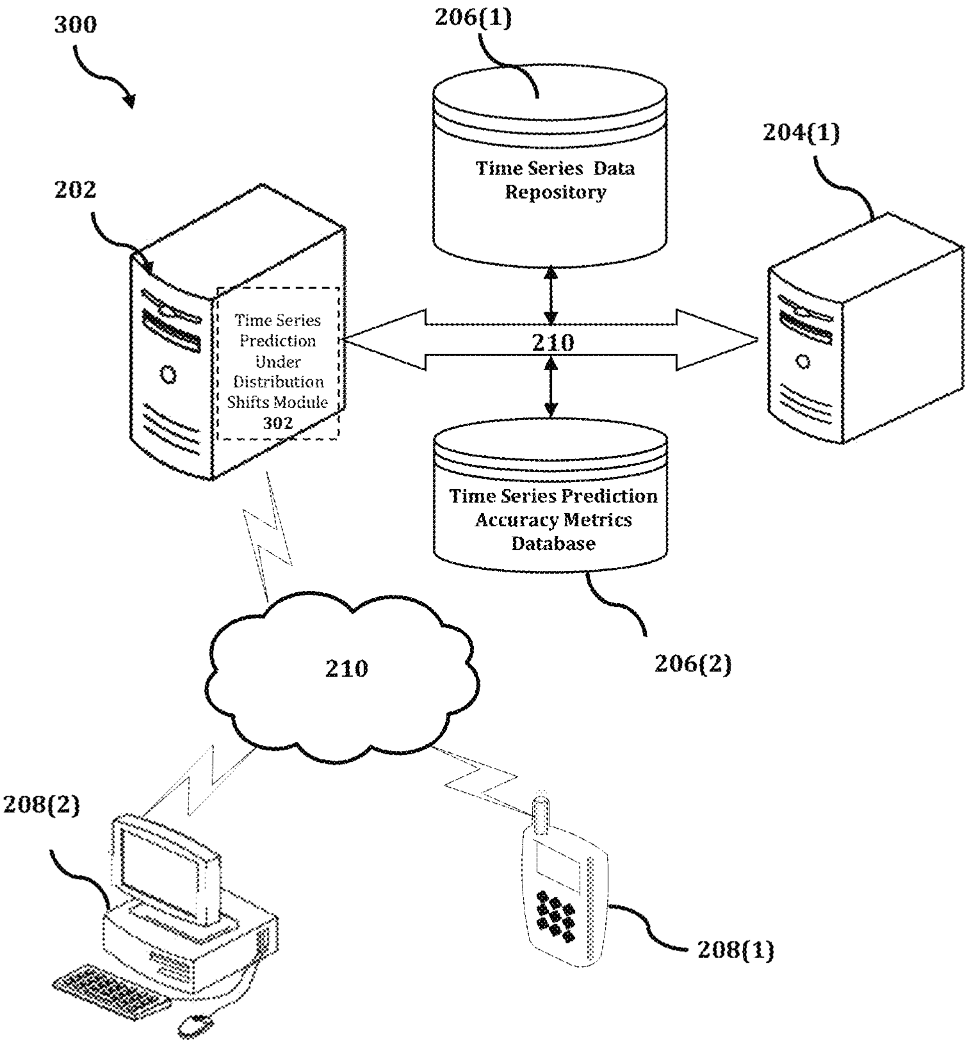
FIG. 3 shows an exemplary system for implementing a method for using a learnable augmentation technique to perform few-shot calibration of a model that is designed to generate time series predictions under distribution shifts with improved accuracy.

The TSPUDS device 202 is described and illustrated in FIG. 3 as including a time series prediction under distribution shifts module 302, although it may include other rules, policies, modules, databases, or applications, for example. As will be described below, the time series prediction under distribution shifts module 302 is configured to implement a method for using a learnable augmentation technique to perform few-shot calibration of a model that is designed to generate time series predictions under distribution shifts with improved accuracy.

An exemplary process 300 for implementing a mechanism for using a learnable augmentation technique to perform few-shot calibration of a model that is designed to generate time series predictions under distribution shifts with improved accuracy by utilizing the network environment of FIG. 2 is illustrated as being executed in FIG. 3. Specifically, a first client device 208(1) and a second client device 208(2) are illustrated as being in communication with TSPUDS device 202. In this regard, the first client device 208(1) and the second client device 208(2) may be "clients" of the TSPUDS device 202 and are described herein as such. Nevertheless, it is to be known and understood that the first client device 208(1) and/or the second client device 208(2) need not necessarily be "clients" of the TSPUDS device 202, or any entity described in association therewith herein. Any additional or alternative relationship may exist between either or both of the first client device 208(1) and the second client device 208(2) and the TSPUDS device 202, or no relationship may exist.

Further, TSPUDS device 202 is illustrated as being able to access a time series data repository 206(1) and a time series prediction accuracy metrics database 206(2). The time series prediction under distribution shifts module 302 may be configured to access these databases for implementing a method for using a learnable augmentation technique to perform few-shot calibration of a model that is designed to generate time series predictions under distribution shifts with improved accuracy.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the TSPUDS device 202 via broadband or cellular communication. Of course, these embodiments are merely exemplary and are not limiting or exhaustive.

Upon being started, the time series prediction under distribution shifts module 302 executes a process for using a learnable augmentation technique to perform few-shot calibration of a model that is designed to generate time series predictions under distribution shifts with improved accuracy. An exemplary process for using a learnable augmentation technique to perform few-shot calibration of a model that is designed to generate time series predictions under distribution shifts with improved accuracy is generally indicated at flowchart 400 in FIG. 4.

Figure 4:
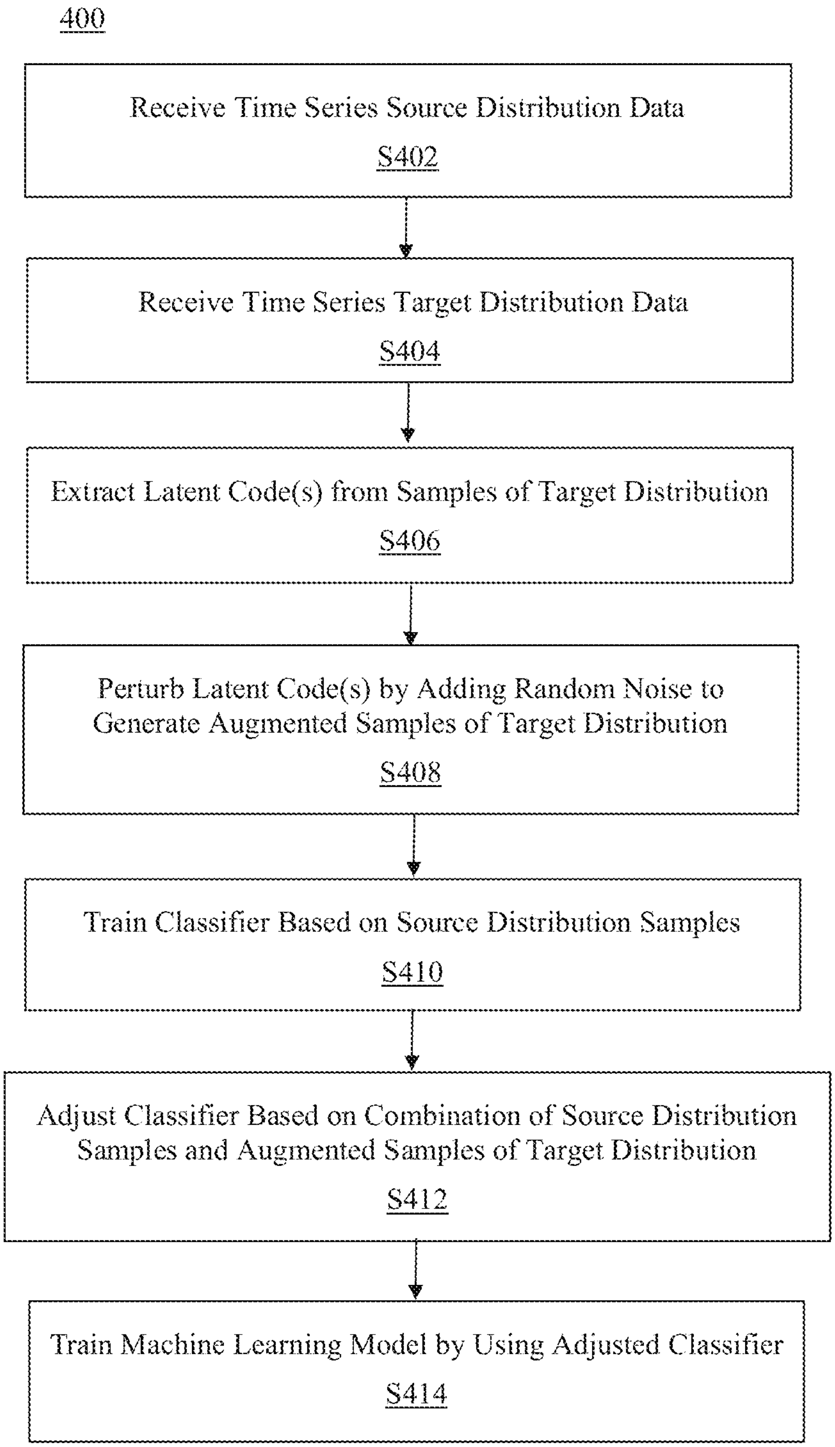
FIG. 4 is a flowchart of an exemplary process for implementing a method for using a learnable augmentation technique to perform few-shot calibration of a model that is designed to generate time series predictions under distribution shifts with improved accuracy.

In process 400 of FIG. 4, at step S402, the time series prediction under distribution shifts module 302 receives first information that relates to a source distribution of a time series. Then, at step S404, the time series prediction under distribution shifts module 302 receives second information that relates to a target distribution of the same time series. In an exemplary embodiment, the source distribution includes time series data that relates to a first predetermined historical time interval, and the target distribution includes time series data that relates to a second predetermined historical time interval that is different from, shorter than, and more recent than the first predetermined time interval. For example, assuming that the present time is represented by T, the source distribution may correspond to a period starting at T minus 10 days and ending at T minus 2 days, i.e., a duration of 8 days, and the target distribution may correspond to a period starting at T minus 2 days and ending at T, i.e., a duration of 2 days immediately ensuing after the 8-day period.

In an exemplary embodiment, the time series may be a univariate time series, such as, for example, a time series that relates to stock market data, i.e., stock prices. Alternatively, the time series may be a multivariate time series, such as, for example, yield rate curve data, weather forecasting data, and/or medical diagnosis data.

At step S406, the time series prediction under distribution shifts module 302 extracts at least one latent code from a plurality of samples of the target distribution. In an exemplary embodiment, the extraction of the latent code may be performed by using an encoder to capture a transformation from a first sample of the target distribution to a second sample of the target distribution.

At step S408, the time series prediction under distribution shifts module 302 perturbs each latent code extracted in step S406 by adding a predetermined amount of random noise in order to generate at least one augmented sample of the target distribution. In an exemplary embodiment, this perturbation step S408 is used to generate a relatively small number of augmented samples, i.e., a "few shots" of augmented samples of the target distribution.

At step S410, the time series prediction under distribution shifts module 302 trains a classifier based on a set of samples of the source distribution. Then, at step S412, the time series prediction under distribution shifts module 302 adjusts the classifier based on a combination of the source distribution samples and a predetermined number of the augmented samples of the target distribution. In an exemplary embodiment, the adjustment is performed by selecting a mixture coefficient value that relates to the predetermined number of the augmented samples being used for forming the combination.

At step S414, the time series prediction under distribution shifts module 302 uses the adjusted classifier to train a predetermined machine learning model that is designed to make future predictions that relate to the time series. In this aspect, the adjustment to the classifier effectively accounts for a distribution shift that may have occurred between the source distribution and the target distribution, and the machine learning model is thus able to generate synthetic samples of the target distribution which, in combination with the few shots of augmented samples, improves the accuracy of predicted values of the time series.

In an exemplary embodiment, a focus is provided on the problem of distribution shift in time series prediction, where the behavior of the time series changes over time. Satisfactory performance of forecasting algorithms requires constant model recalibration or fine-tuning to adapt to the new data distribution. Specifically, the ability to quickly fine-tune a model with only a few training samples available from the new distribution is crucial for many business applications. In an exemplary embodiment, a novel method for learnable data augmentation that effectively adjusts to the new time series distribution with only a few samples is described.

Few-shot Learnable Augmentation for Temporal Shifts—Problem Setting: It is assumed that $D_s=\{(X_s, y_s)|X_s\sim P_s\}$ is the training set from a source distribution, $X_s\in R^{f\times n}$ is the input time series having t time steps, each with dimension f, and $y_s$ is its ground truth label. In addition, $D_t=\{(X_t, y_t)|X_t\sim P_t\}$ is data from a target distribution which is different from the source distribution, $P_t\neq P_s$. Specifically, there is a focus on the problem of few-shot learning with distributional shifts where only limited training samples are available in target distribution, $|D_t|\ll|D_t|$. The goal is to transfer knowledge from the source distribution, $D_s$, to the target distribution, $D_t$, in order to learn a classifier that generalizes well to the target distribution $P_t$ with limited training samples.

Due to the small number of training samples in the target distribution, $D_t$, simply training a classifier on a few samples from this distribution would be prone to overfitting. Thus, a novel time-series augmentation technique is provided, in order to diversify training data in the target distribution.

To synthesize additional data, a learnable augmentation method based on a Δ-encoder is introduced. Instead of using heuristic augmentation to synthesize new samples, a learnable data augmentation may be implemented by capturing the inner-class variances of samples. An autoencoder architecture may be leveraged to encode the transformation from one sample to another into a latent code and reuse these codes to augment new samples. Specifically, let $(X_s, X_{s'})$ be a pair of samples from the same class. An encoder, E, aims to capture the transformation from $X_s$ to $X_{s'}$ into a latent code as:

$$E(X_s,X_{s'})=z_{s\to s'}, \quad \text{(Expression 1)}$$

where $z_{s\to s'}\in R^d$ is a low-dimensional latent code encoding the transformation from sample s to $s^0$. Given the latent code, a decoder, D, is trained to reconstruct sample s' given s:

$$D(X_s,z_{s\to s'})\approx X_{s'}. \quad \text{(Expression 2)}$$

Both the encoder, E, and decoder, D, are trained end-to-end by minimizing the $l_1$ reconstruction loss between decoder's output and original sample $X_{s'}$. Thus, the encoder would learn to capture class-invariance transformation in the source distribution. By this technique, latent code is extracted from source distribution pairs and these codes are then applied on few samples from target distribution to synthesize new data as: $D(X_t, z_{s\to s'})=\widetilde{X_t}$. Although this improves performances on few-shot learning where both train and test data are from the same distribution but different classes, it is ineffective when dealing with distributional shifts in financial applications. To be specific, when $P_s\neq P_t$, augmenting $X_t$ with latent code $z_{s\to s'}$ will construct a new sample $\widetilde{X_t}$ that follows $P_s$ but not the target distribution $P_t$.

Figure 5:
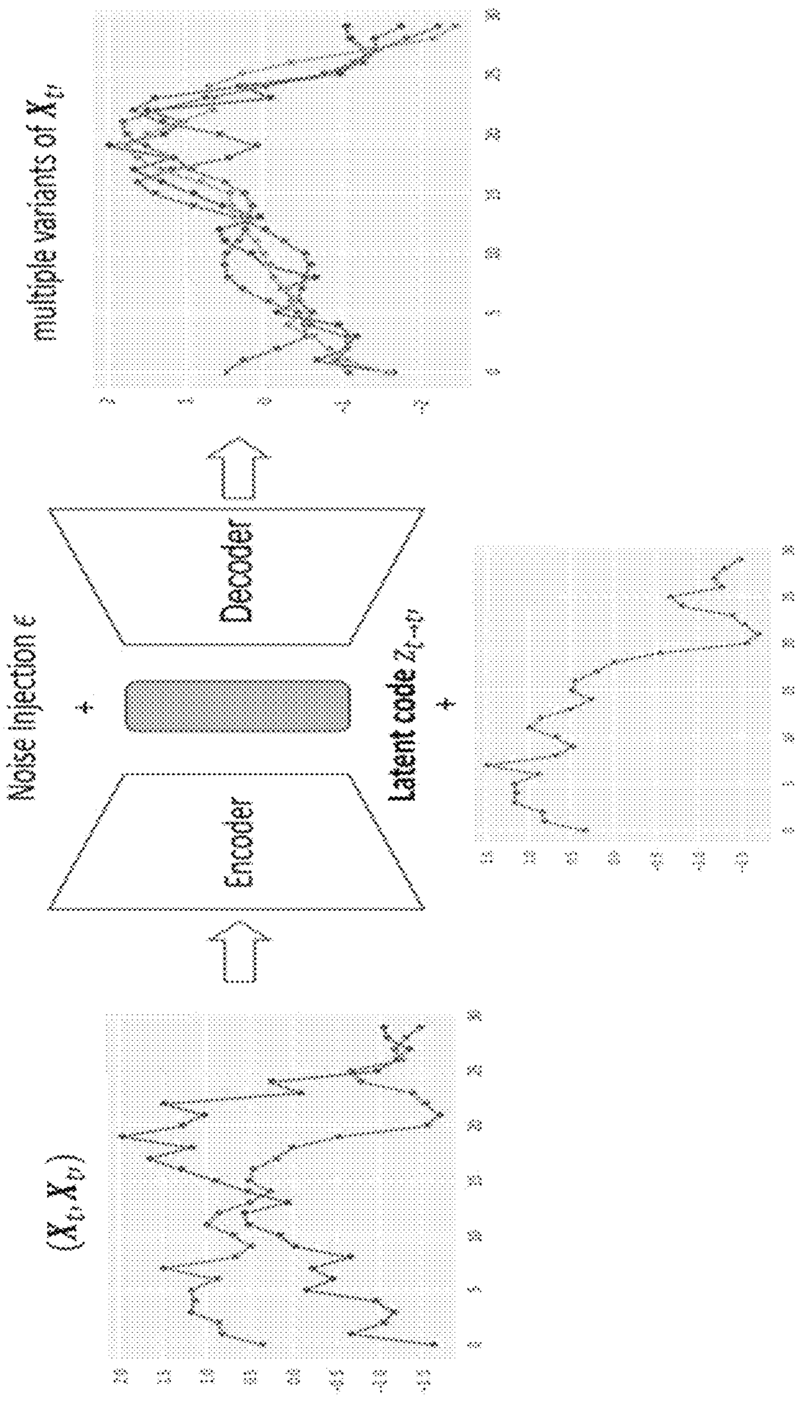
FIG. 5 is a diagram that illustrates an extraction of a latent vector that facilitates a synthesis of multiple variants of a time series in an execution of a method for using a learnable augmentation technique to perform few-shot calibration of a model that is designed to generate time series predictions under distribution shifts with improved accuracy, according to an exemplary embodiment.

To address this shortcoming, in an exemplary embodiment, a latent code perturbation scheme conditions the latent codes on the target distribution, $D_t$, to capture the target distribution, $P_t$. FIG. 5 is a diagram 500 that illustrates an extraction of a latent vector that facilitates a synthesis of multiple variants of a time series in an execution of a method for using a learnable augmentation technique to perform few-shot calibration of a model that is designed to generate time series predictions under distribution shifts with improved accuracy, according to an exemplary embodiment. As illustrated in FIG. 5, given a pair of sequences $(X_t, X_{t'})$ in the target distribution, the framework extracts a latent vector $z_{t\to t'}$ which captures the transformation from $X_t$ to $X_{t'}$. By slightly perturbing this latent vector, multiple variants of $X_{t'}$ may be synthesized.

Latent Code Perturbation: Instead of relying on the latent codes from the source distribution, $z_{t\to t'}$, latent codes are extracted from the few samples in the target distribution following:

$$E(X_t, X_{t'}) = z_{t\to t'}, \quad \text{(Expression 3)}$$

where $z_{t\to t}'$ is a latent code in target distribution. Naively using this code on $X_t$ would simply reconstruct the original data $X_t'$ without diversifying the training set. Thus, a slight perturbation of the latent code is effected based on random noise, as:

$$D(X_t, z_{t\to t'} + \epsilon) = X_{t'}^{\epsilon}, \quad \text{(Expression 4)}$$

where $$X_{t'}^{\epsilon}$$

is the augmented variant of $X_{t'}$ based on random noise.

In an exemplary embodiment, using perturbed latent code instead of transferring latent code has the effect of directly capturing inner-class variances from the target distribution and avoiding overfitting to latent code from the source distribution.

Augmentation Re-labeling. As the latent code is randomly perturbed, augmented sample $$X_{t'}^{\epsilon}$$

might no longer retain the same label as $X_{t'}$ due to the non-interpretability of the augmentation operation, $D(\cdot)$. Thus, in an exemplary embodiment, the augmented sample is relabeled in order to account for any semantic changes during the augmentation progress. A classifier, C, is trained on source distribution $D_s$ and an assignment of its most confident prediction on an augmented sample is designated as its new label:

$$\text{argmax}_y C(y \mid X_{t'}^{\epsilon}) = y_{t'}^{\epsilon}, \quad \text{(Expression 5)}$$

where $$y_{t'}^{\epsilon}$$

is the new label for augmented sample $$X_{t'}^{\epsilon}.$$

Learning with Mixture of Real and Augmented Samples: In an exemplary embodiment, an adjustment to the classifier is made by fine-tuning the classifier, C, on the mixture of both real and augmented samples to adapt it to the target distribution as follows:

$$\min_C \sum\nolimits_{(X_t, y_t)\in D_t} [L(C(X_t), y_t)) + \lambda L(C(X_{t'}^{\epsilon}), y_{t'}^{\epsilon})], \quad \text{(Expression 6)}$$

where λ is the mixture coefficient that controls the influence of augmented samples on the classifier. In this aspect, the larger λ is, the more emphasis is placed on augmented samples.

Accordingly, with this technology, a process for using a learnable augmentation technique to perform few-shot calibration of a model that is designed to generate time series predictions under distribution shifts with improved accuracy is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for performing time series prediction, the method being implemented by at least one processor, the method comprising:

receiving, by the at least one processor, first information that relates to a source distribution of a time series;

receiving, by the at least one processor, second information that relates to a target distribution of the time series;

extracting, by the at least one processor, at least one latent code from a plurality of samples of the target distribution;

perturbing, by the at least one processor, the extracted at least one latent code by adding a predetermined amount of random noise in order to generate at least one augmented sample of the target distribution;

training, by the at least one processor, a classifier based on a plurality of samples of the source distribution;

adjusting, by the at least one processor, the classifier based on a combination of the plurality of samples of the source distribution and a predetermined number of the at least one augmented sample of the target distribution; and training, by the at least one processor by using the adjusted classifier, a predetermined machine learning model that is usable for making future predictions that relate to the time series, wherein the time series comprises a univariate time series, and wherein the univariate time series comprises a first time series that relates to stock market data.

2. The method of claim 1, wherein the extracting of the at least one latent code comprises using an encoder to capture a transformation from a first sample of the target distribution to a second sample of the target distribution.

3. The method of claim 1, wherein the adjusting comprises selecting a mixture coefficient value that relates to the predetermined number of the at least one augmented sample used for forming the combination.

4. The method of claim 1, wherein the source distribution comprises time series data that relates to a first predetermined historical time interval, and the target distribution comprises time series data that relates to a second predetermined historical time interval that is different from, shorter than, and more recent than the first predetermined historical time interval.

5. The method of claim 1, wherein the predetermined machine learning model includes at least one from among a tree-based model, a neural network model, and a linear model.

6. A method for performing time series prediction, the method being implemented by at least one processor, the method comprising:

receiving, by the at least one processor, first information that relates to a source distribution of a time series;

receiving, by the at least one processor, second information that relates to a target distribution of the time series;

extracting, by the at least one processor, at least one latent code from a plurality of samples of the target distribution;

perturbing, by the at least one processor, the extracted at least one latent code by adding a predetermined amount of random noise in order to generate at least one augmented sample of the target distribution;

training, by the at least one processor, a classifier based on a plurality of samples of the source distribution;

adjusting, by the at least one processor, the classifier based on a combination of the plurality of samples of the source distribution and a predetermined number of the at least one augmented sample of the target distribution; and training, by the at least one processor by using the adjusted classifier, a predetermined machine learning model that is usable for making future predictions that relate to the time series, wherein the time series comprises a multivariate time series, and wherein the multivariate time series comprises one from among a second time series that relates to yield rate curve data, a third time series that relates to weather forecasting data, and a fourth time series that relates to medical diagnosis data.

7. A computing apparatus for performing time series prediction, the computing apparatus comprising:

a processor;

a memory; and a communication interface coupled to each of the processor and the memory, wherein the processor is configured to:

receive, via the communication interface, first information that relates to a source distribution of a time series;

receive, via the communication interface, second information that relates to a target distribution of the time series;

extract at least one latent code from a plurality of samples of the target distribution;

perturb the extracted at least one latent code by adding a predetermined amount of random noise in order to generate at least one augmented sample of the target distribution;

train a classifier based on a plurality of samples of the source distribution;

adjust the classifier based on a combination of the plurality of samples of the source distribution and a predetermined number of the at least one augmented sample of the target distribution; and train, by using the adjusted classifier, a predetermined machine learning model that is usable for making future predictions that relate to the time series, wherein the time series comprises a univariate time series, and wherein the univariate time series comprises a first time series that relates to stock market data.

8. The computing apparatus of claim 7, wherein the processor is further configured to extract the at least one latent code by using an encoder to capture a transformation from a first sample of the target distribution to a second sample of the target distribution.

9. The computing apparatus of claim 7, wherein the processor is further configured to perform the adjustment of the classifier by selecting a mixture coefficient value that relates to the predetermined number of the at least one augmented sample used for forming the combination.

10. The computing apparatus of claim 7, wherein the source distribution comprises time series data that relates to a first predetermined historical time interval, and the target distribution comprises time series data that relates to a second predetermined historical time interval that is different from, shorter than, and more recent than the first predetermined historical time interval.

11. The computing apparatus of claim 7, wherein the predetermined machine learning model includes at least one from among a tree-based model, a neural network model, and a linear model.

12. A computing apparatus for performing time series prediction, the computing apparatus comprising:

a processor;

a memory; and a communication interface coupled to each of the processor and the memory, wherein the processor is configured to:

receive, via the communication interface, first information that relates to a source distribution of a time series;

receive, via the communication interface, second information that relates to a target distribution of the time series;

extract at least one latent code from a plurality of samples of the target distribution;

perturb the extracted at least one latent code by adding a predetermined amount of random noise in order to generate at least one augmented sample of the target distribution;

train a classifier based on a plurality of samples of the source distribution;

adjust the classifier based on a combination of the plurality of samples of the source distribution and a predetermined number of the at least one augmented sample of the target distribution; and train, by using the adjusted classifier, a predetermined machine learning model that is usable for making future predictions that relate to the time series, wherein the time series comprises a multivariate time series, and wherein the multivariate time series comprises one from among a second time series that relates to yield rate curve data, a third time series that relates to weather forecasting data, and a fourth time series that relates to medical diagnosis data.

* * * * *